United States Patent

So

[15] 3,649,751

[45] Mar. 14, 1972

[54] COMPRESSED BANDWIDTH TRANSMISSION SYSEM

[72] Inventor: Richard T. So, Chicago, Ill.

[73] Assignee: Stewart-Warner Corporation, Chicago, Ill.

[22] Filed: Jan. 23, 1970

[21] Appl. No.: 5,210

[52] U.S. Cl. ....................178/6, 178/DIG. 3, 325/38 A

[51] Int. Cl. ....................H04n 1/40

[58] Field of Search ....................178/DIG. 3, 68, 6; 325/38 A; 340/347 AD, 347 DD, 347 NT

[56] References Cited

UNITED STATES PATENTS

| | | | |
|---|---|---|---|
| 3,530,385 | 9/1970 | Smith et al. | 325/38 A |
| 3,495,032 | 2/1970 | Smith | 178/DIG. 3 |

*Primary Examiner*—Robert L. Griffin
*Assistant Examiner*—Richard K. Eckert, Jr.
*Attorney*—Augustus G. Douvas, William J. Newman and Norton Lesser

[57] ABSTRACT

A system for reducing the required bandwidth in a facsimile data transmission system or the like in which a two level digital signal, which may be derived from an analog scanning signal, is caused to be converted into and transmitted as a duo-binary signal whenever the digital signal pulse rate is greater than a predetermined minimum and transmitted as a binary signal whenever the pulse rate is lower than the predetermined rate. The system operates to produce signals which vary from an intermediate level representing black to one of two outer levels representing white as long as each black representing pulse is longer than a predetermined duration. If the black pulse is shorter than the predetermined duration the signal changes to vary between the intermediate or black level and the other lower or white level. A two level to three level converter comprising a differential amplifier and a flip-flop is shown as well as a digitally operated toggle switch for switching the level converter. In addition, a novel analog to digital converter utilizing a differential amplifier operating about an average DC slicing level is disclosed.

2 Claims, 8 Drawing Figures

INVENTOR
Richard T. So

By

ATTORNEY

INVENTOR
Richard T. So.

By William J. Keeman
ATTORNEY

INVENTOR
Richard T. So.

By William J. Newman
ATTORNEY.

INVENTOR
Richard T. So.

By William J. Newman
ATTORNEY.

INVENTOR
Richard T. So.

By William J. Newman
ATTORNEY.

INVENTOR
Richard T. So.

By William J. Newman
ATTORNEY

COMPRESSED BANDWIDTH TRANSMISSION SYSEM

BACKGROUND OF THE INVENTION

This invention relates to the transmission of data information and more particularly to a system for increasing the speed at which data may be transmitted utilizing digital techniques. The techniques of this invention are particularly adaptable for use in facsimile systems in which the data does not appear in a full bauded form (clock time sequenced) but rather in a random time sequence. Moreover, a detailed reading of the following specification will suggest other applications of these techniques.

There have been a number of techniques utilized in the electrical signal communication field to increase the speed of data transmission. One of the simplest of these is a duo-binary technique in which a train of binary pulses is applied to an encoding circuit which inverts the polarity of every other pulse to a three level signal in which the intermediate level represents one binary state and the two outer levels alternately represent the other binary state. An example of such a system is known in U.S. Pat. No. 2,700,696 issued to R. H. Barker. Such a system has been found not to be particularly suitable in facsimile systems because of certain signal distortions caused by the low pass filtering required for the data transmission modems of such systems. A low frequency duo-binary encoded signal causes pronounced ringing at the beginning and end of each pulse when passed through a low pass filter. Furthermore, there are substantial phase distortions when a duo-binary signal in the midfrequency range of the pass band is applied to the filter. This is because of the higher harmonic content (especially the second harmonic) in duo-binary signal as compared to a straight binary signal. Such distortions make the duo-binary systems unsuitable for use in some facsimile systems, especially when used to transmit copy representations over lower quality telephone networks such as the dial network systems.

It has been found that the disadvantages of the duo-binary techniques may be overcome to a great extend by the use of biternary transmission techniques. In such a system the data is transmitted in a straight binary manner when the data pulse rate is at lower frequencies and is transmitted in a duo-binary manner when the data pulse rate is at higher frequencies. A number of biternary systems have been developed as shown in U.S. Pat. Nos. 3,162,724; 3,234,465 and 3,238,299. These systems, however, only apply to the handling of full bauded signal trains in which each data element of the signal has a precise time duration controlled by a clock. The particular systems shown are not applicable to a train of signals in which the pulses occur randomly as is the case in a facsimile transmission system.

SUMMARY OF THE INVENTION

In accordance with this invention a system has been developed for forming a biternary signal from a random pulse binary train. It does so by measuring the time duration of each mark (or space) indicating pulse. If the actual time duration of such pulse is longer than a predetermined time duration, a three level signal producing circuit is caused to produce a signal which fluctuates between the intermediate of the three levels and one of the outer levels. However, each time the duration of one of said pulses is shorter than the predetermined time, the three level signal producing means is caused to switch to operation between the intermediate level and the opposite outer level. By measuring the actual time duration of the pulses and controlling the operable circuits in accordance with that time duration, the system is usable in applications such as facsimile to accurately transmit and reproduce digital data at a higher speed.

Also included as features of this invention are particular circuits for performing various functions of the data transmission system in an accurate and economical manner. A novel two level to three level signal converter is included which utilizes a differential amplifier and an ordinary flip-flop circuit.

Another feature is a novel analog to digital converter circuit for transforming the facsimile optical scanning signals into straight binary signals for further handling by the data transmission system. A high grain differential amplifier is used which operates at one input about an average DC slicing level representative of the optical density of the copy document being scanned. Thus, very simple means are provided for producing accurate binary signals representative of the copy document regardless of any substantial changes in the color of the document background or copy.

The features of this invention will be better understood upon a further reading of this specification, especially when taken in view of the accompanying drawings in which.

Figure 1:
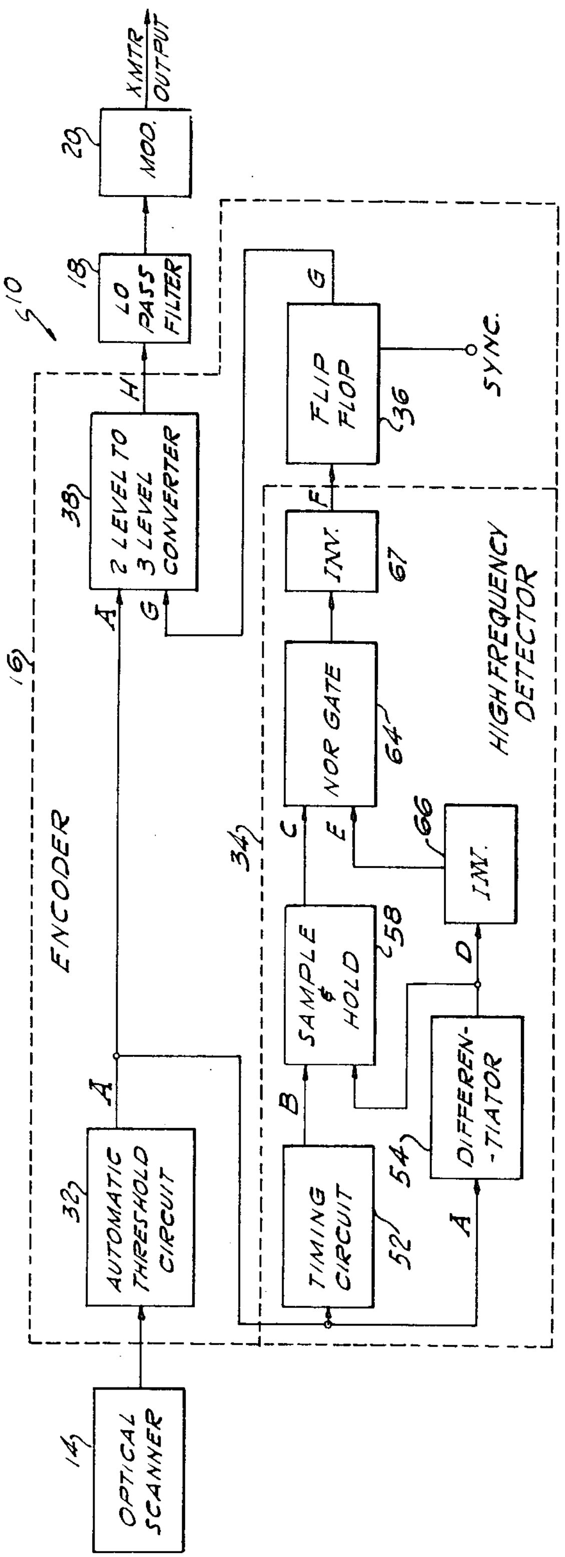
FIG. 1 is a block diagram of a facsimile transmitter embodying the techniques of this invention.
Figure 2:
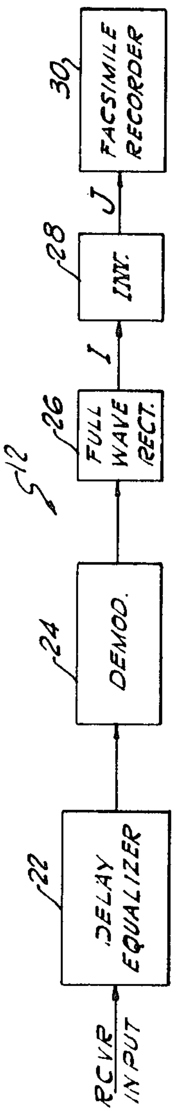
FIG. 2 is a block diagram of a facsimile receiver for decoding the signals transmitted by the transmitter of FIG. 1 to reproduce the scanned document.

Referring first to FIGS. 1 and 2, there is shown a typical application of the teachings of this invention to a facsimile system which includes a facsimile transmitter 10 and a facsimile receiver 12. The transmitter 10 utilizes an optical scanner 14 of any type well known which produces electric signals at its output that vary in level in proportion to the density of the markings on the copy document. The scanner signals are acted upon by an encoder system 16 which prepares the signals in accordance with the teachings of this invention to provide a high intelligence capacity data signal. The Low pass filter limits the width of the baseband and thereby restricts the extent of the sidebands produced by the modulator. At the receiver the modulated carrier is applied first to a delay equalizer 22 to correct for delay distortions which can be expected from its transmission through the data channel. The demodulator 24 extracts the data signal from the carrier in any well known manner. The demodulated signal is then applied to a full wave rectifier 26 and thereafter to an inverter 28 which together act as a signal decoder for developing the proper marking signals to a facsimile recorder 30 of any well-known type. An example of apparatus which may serve the function of the transmitter optical scanner 14 and the receiver recorder 30 may be seen in the copending application of Brouwer and Sobchak Ser. No. 613,545, filed Feb. 2, 1967, now U.S. Pat. No. 3,527,882, assigned to the same assignee as the present application.

Figure 3:
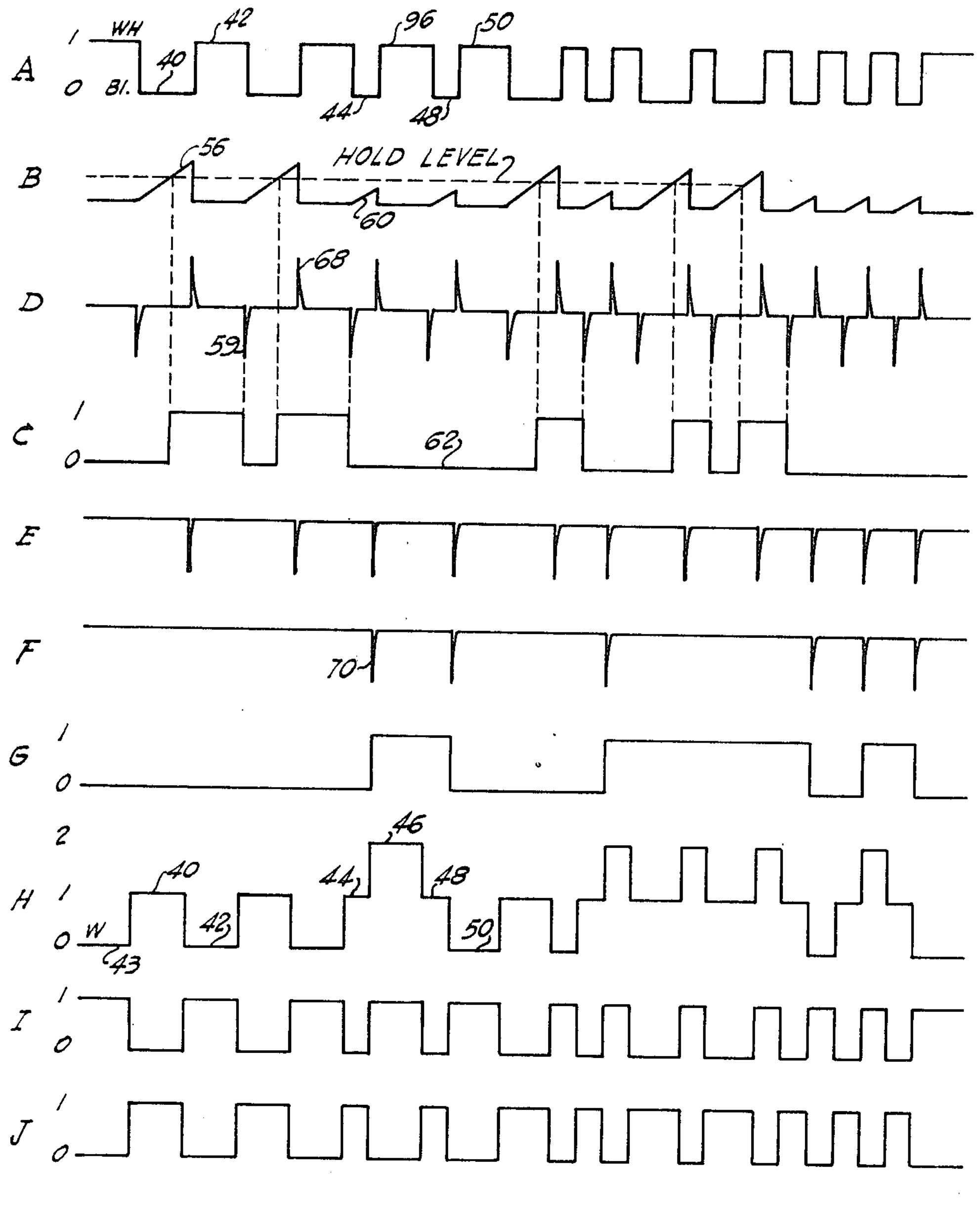
FIG. 3 is a graphical representation of various waveforms appearing at designated points in the transmission system.
Figure 4:
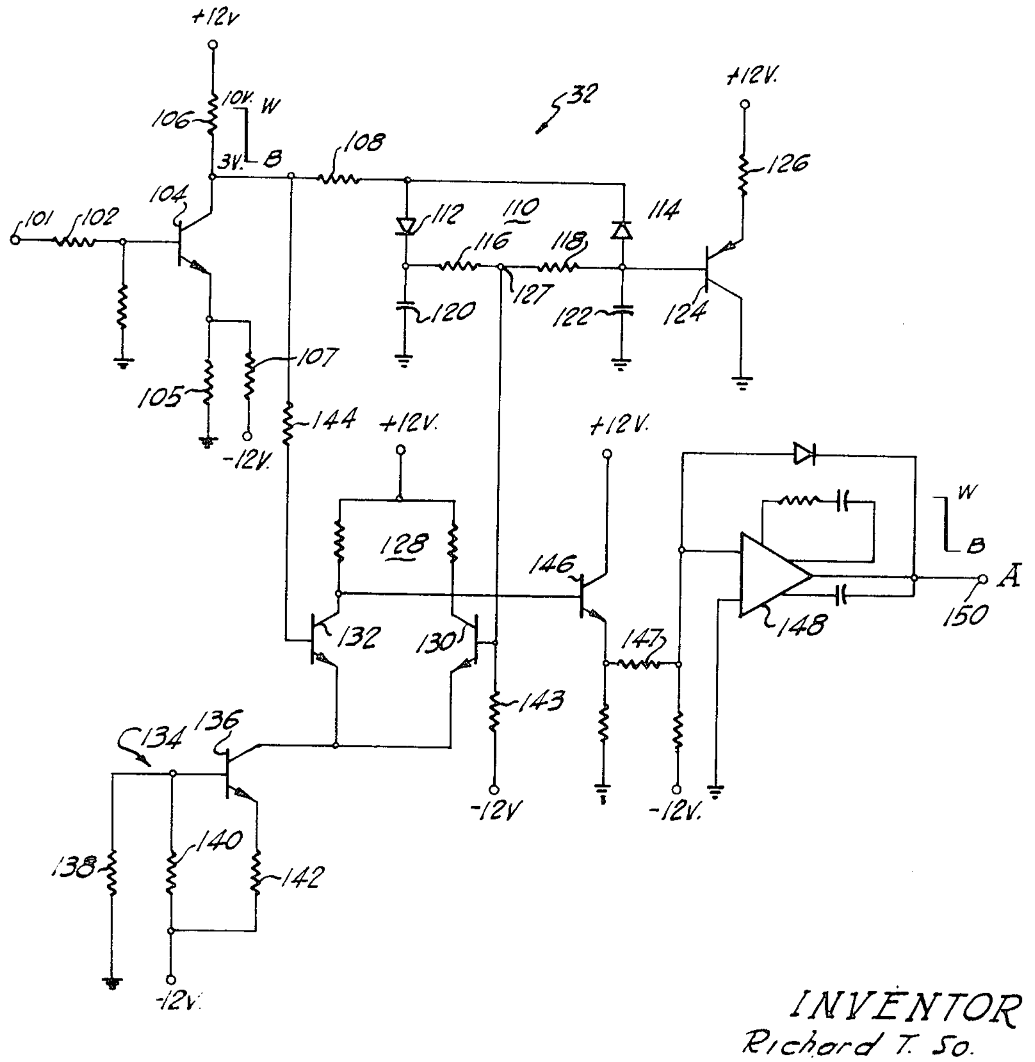
FIG. 4 is a detailed schematic circuit representation of the automatic threshold circuit utilized in the facsimile system.

Reference is again made to FIG. 1 for a more specific description of the encoder system 16. The scanning signal from the optical scanner 14, which varies in voltage level with some proportionality to the density of the markings on the copy document, is supplied to an automatic threshold circuit 32. This circuit changes the infinitely variable signal to a two level signal which will represent to the facsimile recorder at the receiver to reproduce black or white. Although this circuit will be described in more detail with respect to the schematic diagram of FIG. 4, briefly it operates to examine the voltage level of each element of the variable level optical scanner signal and makes a decision as to its transmission as a black level or a white level signal. It thus operates as an analog to digital converter and includes special provisions for varying the decision level of the signal in accordance with the average level of the incoming signal in a manner to be hereinafter described. The circuit provides a signal at its output having a two level binary form in which a high or a "1" level indicates white and a low or "O" level indicates black. Waveform A in FIG. 3 represents the type signal appearing at the output of the automatic threshold circuit as indicated by the reference letter A in FIG. 1. The other waveforms in FIG. 3 are also appropriately located in FIGS. 1 and 2.

The two level signal from the automatic threshold 32 is applied to the input of a high frequency detector circuit 34 which measures the actual time duration of the pulses and indicates to a converter 38 through flip-flop 36 whether it should operate to provide the two level or three level signal for modulation and transmission dependent on the actual time duration of each pulse of the signal. To be more specific, in the preferred embodiment described herein the high frequency detector 34 measures the black level portions 40 of the automatic threshold circuit signal (FIG. 3 waveform A) and determines the operating level of the next appearing white level portion at the output of the two level to three level converter 38 (FIG. 3 waveform H). That is, as long as a black level portion 40 of signal A is greater than the predetermined duration, a signal H will operate between an intermediate level "1" representing the black level and one of the extreme levels "0" or "2", either of which represents a white level in the data signal. Thus, the first black level pulse 40 in the train is represented in the converter output waveform H as an intermediate level "1" and since its duration is greater than the predetermined duration, the next following white level 42 is represented as a "0" level in waveform H, or the same level as the previously appearing white level as indicated at 43 in waveform H. Looking, however, at black pulse 44 in waveform A, the high frequency detector determines that it is shorter than the predetermined duration and causes the immediately following white level portion 46 of the converter output signal to be represented as a "2" level, as shown in output waveform H. Since the next black portion 48 is again shorter than the predetermined minimum, the immediately following white portion 50 is caused to be represented in waveform H as a "O" level signal. Thus, a biternary signal (waveform H) is produced for transmission which is formed in response to the actual time duration of each black level portion of the facsimile data signal (waveform A), these black level portions appearing in random time sequence without any dependence on clocked time intervals as in previous biternary data transmission systems.

In facsimile applications it is preferable to measure the durations of the black level portions of the signal because short duration white to black and return to white transitions occur much more frequently in printed copy documents than short duration transitions from black to white and return to black. It is recognized, however, that in other applications the reverse might be true or that it makes no real difference so that the broadest aspects of this invention apply to either type of system.

Returning again to FIG. 1 for a description of how the system operates to provide the biternary signal, the two level automatic threshold circuit signal is applied to the timing circuit 52 and a differentiator 54 forming the input of the high frequency detector 34. The timing circuit 52 is a ramp generator which produces a signal such as waveform B in FIG. 3 with ramps 56 generated during each black level portion of the input signal. The ramp form signal is applied to a sample and hold circuit 58 which, whenever the ramp exceeds a predetermined hold level, causes its output signal level to go from a "0" level to a "1" level as indicated by waveform C of FIG. 3. The sample and hold circuit 58 stays at the "1" level until the end of the next following white level portion as determined by the low going pulses 59 in the output signal of the differentiator 54 represented by waveform D of FIG. 3. Whenever the time duration of a black level portion of signal A is shorter than the predetermined time as referenced at 44 in FIG. 3, the corresponding ramp 60 in the timing signal B does not reach the hold level and therefore the sample and hold signal C does not switch to its "1" level, but remains at the "O" level as indicated at reference 62 in waveform C.

The sample and hold waveform signal C is supplied to one input of a NOR-gate 64. The other input to gate 64 is connected to an inverter 66 which passes in inverted form the high going pulses 68 of the differentiator 54. These low going pulses 70, as shown in waveform E of FIG. 3, represent the leading edge of each white level portion of the data signal. As may be seen in waveform F of FIG. 3, which is the inverse of the output of NOR-gate 64 caused by inverter 67, the "1" condition of the sample and hold signal C acts as an inhibit to the passage of the white level leading edge pulses from the inverter 66. Thus, only when the sample and hold circuit establishes that a black level is shorter than the predetermined time duration and stays at its "O" level is the NOR-gate 64 enable to pass the white level leading edge pulses 70 to the output of the high frequency detector 34. These output pulses 70 are applied to the flip-flop 36 which is caused to change state with the receipt of each negative going pulse at its input in a normal manner. It therefore produces a signal such as waveform G in FIG. 3 which it provides to the two level to three level converter 38. A sync pulse, which is generated at the beginning of each line of scan is applied to the reset terminal of the flip-flop so that it starts in the same state for each line.

The two level to three level converter 38 is also in receipt of the automatic threshold circuit signal (waveform A). It functions to provide at its output a "O" level a "1" level or a "2" level signal determined by the particular states of its input from the automatic threshold circuit 32 and the flip-flop 36. The following table shows the input/output functions of the converter for each representative condition of its two inputs, and a study of it along with waveforms A, G and H will give an understanding of the generation of biternary output signal H based on the status of the input data signal and the flip-flop 36.

TABLE 1

| Inverter output A | Flip-flop output G | Converter output H |
|---|---|---|
| 1 | 0 | 0 |
| 0 | 0 | 1 |
| 1 | 1 | 2 |
| 0 | 1 | 1 |

The resultant signal H which is passed through the low pass filter 18 and caused to modulate a carrier signal in modulator 20 is transmitted over the data channel to a receiver 12. The received modulated carrier signal is delay equalized in circuit 22 and demodulated in circuit 24 in a well known manner to obtain at the input to the full wave rectifier 26 a signal resembling the biternary signal H of FIG. 3. The rectifier 26 is set to operate about the intermediate or "1" level of the waveform H so that the signal at its output as represented by waveform I is a two level signal in which the "O" level is representative of black copy density and the "1" level is representative of white copy density which, as will be seen, is a reproduction of the waveform A present at the output of the transmitter automatic threshold circuit. In the particular embodiment shown and described, the rectifier signal must be inverted in order for the facsimile recorder 30 to cause a mark on the recording media during the black level portions of the signal and refrain from making a mark during the white level portions of the signal.

The individual circuits making up the data encoder 16 will now be described in detail. The automatic threshold circuit 32 is shown in schematic form in FIG. 4. The purpose of this circuit is to transform the analog signal developed by the facsimile optical scanner into a digital two level signal at its output for operation by the remainder of the digitally operated circuits of the transmitter. As is well known, the optical scanner produces signals which vary from a first level of perhaps 0 volts representing white to a second level of perhaps 7 volts representing black, with intermediate levels representing different shades of gray or other colors therebetween. The circuit provides a slicing level at which a decision is made whether a particular shade should be copied as black or as white. For example, some documents may have faded or different color letters other than black and some documents may have gray of different color backgrounds other than white. It is desirable that the system be able to accommodate the various kinds of copy accurately even if the copy changes within the confines of a single document.

Figure 5:
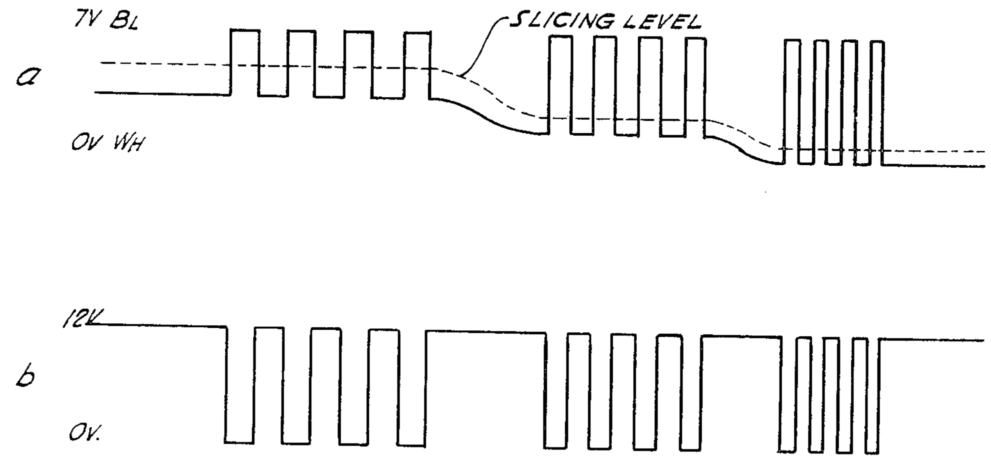
FIG. 5 is a graphic representation of the signals at the input and output of the automatic threshold circuit of FIG. 4.

The action of the automatic threshold circuit may be better understood from the waveforms in FIG. 5 where the graph marked a represents the optical scanner output and the one marked *b* represents the output of the automatic threshold circuit. As can be seen, the slicing level shifts in proportion to the change in the background of the copy and also changes in scanner output level. The automatically variable slicing level insures that the desired intelligence data is properly transformed into digital form.

The scanner output is applied to terminals 101 where it is fed through a resistor 102 to the base of transistor 104. In order to keep transistor 104 in linear operation when input is at 0 volts, the emitter is set by 0.7 v., the turn-on voltage of transistor 104, by means of emitter resistors 105,107. The inverted signal at the collector of transistor 104 is applied through resistor 108 to an average DC detector circuit 110 comprising diodes 112, 114, resistors 116, 118, capacitors 120, 122, transistor 124 and resistor 126. The circuit operates to provide at junction 127 the average between the levels established at the collector of transistor 104.

Assuming first that the scanner is viewing black typewritten copy on ordinary white paper, the collector of transistor 104 may be varying between 10 volts representing white and 3 volts representing black. Capacitor 120 will charge to maintain itself at approximately the 10 volt level in view of the diode 112. Capacitor 122, on the other hand, will charge to and maintain itself at approximately the 3 volt level by action of the diode 114 and the base-emitter circuit of transistor 124. The voltage at point 127 would be in the range of approximately 7 to 8 volts. Assume, however, that the printing on a later portion of the document is red or some color other than black. That would cause the minimum level at the collector of transistor 104 to raise from the 3 volt level to perhaps 6 volts, the upper level remaining at 10 volts. Capacitor 120 maintains its charge at around 10 volts but capacitor 122, in view of the blocking action of diode 114, will charge through the base circuit of transistor 124 to approximately 6 volts with an average of maybe 8½ to 9 volts appearing at point 127. If the background color changes the upper level of the signal at the collector of transistor 104 changes and the charge on capacitor 120 changes accordingly to vary the average level at junction 127.

The average DC junction point 127 is connected to one input of a differential amplifier 128 formed by high gain transistors 130, 132 and the constant current source 134 formed by transistors 136 and resistors 138, 140 and 142. The other input to the differential amplifier 128 is received through resistor 144 from the collector of transistor 104. The differential amplifier operates of course such that when the scanning signal appearing at the base of transistor 132 is above the DC average level applied to transistor 130, transistor 132 conducts placing a low voltage from its collector to the base of an emitter follower transistor 146. When the scanning signal drops below the DC average, transistor 132 turns off and places a high voltage at the base of transistor 146. The differential amplifier 128 is preferably a high gain circuit so that very small incremental differences between the inputs to transistors 130 and 132 will cause a shift of the circuit so that the input to transistor 146 is either a high level indicating black or a low level indicating white, depending upon whether the scanning signal is below or above the DC average. The resistor 143 connected between the base of transistor 130 and a minus voltage source is provided so that during a long all-white signal a marking signal will not be passed from the differential amplifier caused by noise or amplifier drift. The emitter follower circuit 146 at the output of amplifier 128 provides an impedance match through resistor 147 to the input of an operational amplifier 148. This circuit amplifies and inverts the signal so that a signal appears at the output terminal 150 having an upper level of approximately 12 volts indicating white and a low level of approximately 0 volts indicating black which is the form of signal A in FIG. 3.

Figure 6:
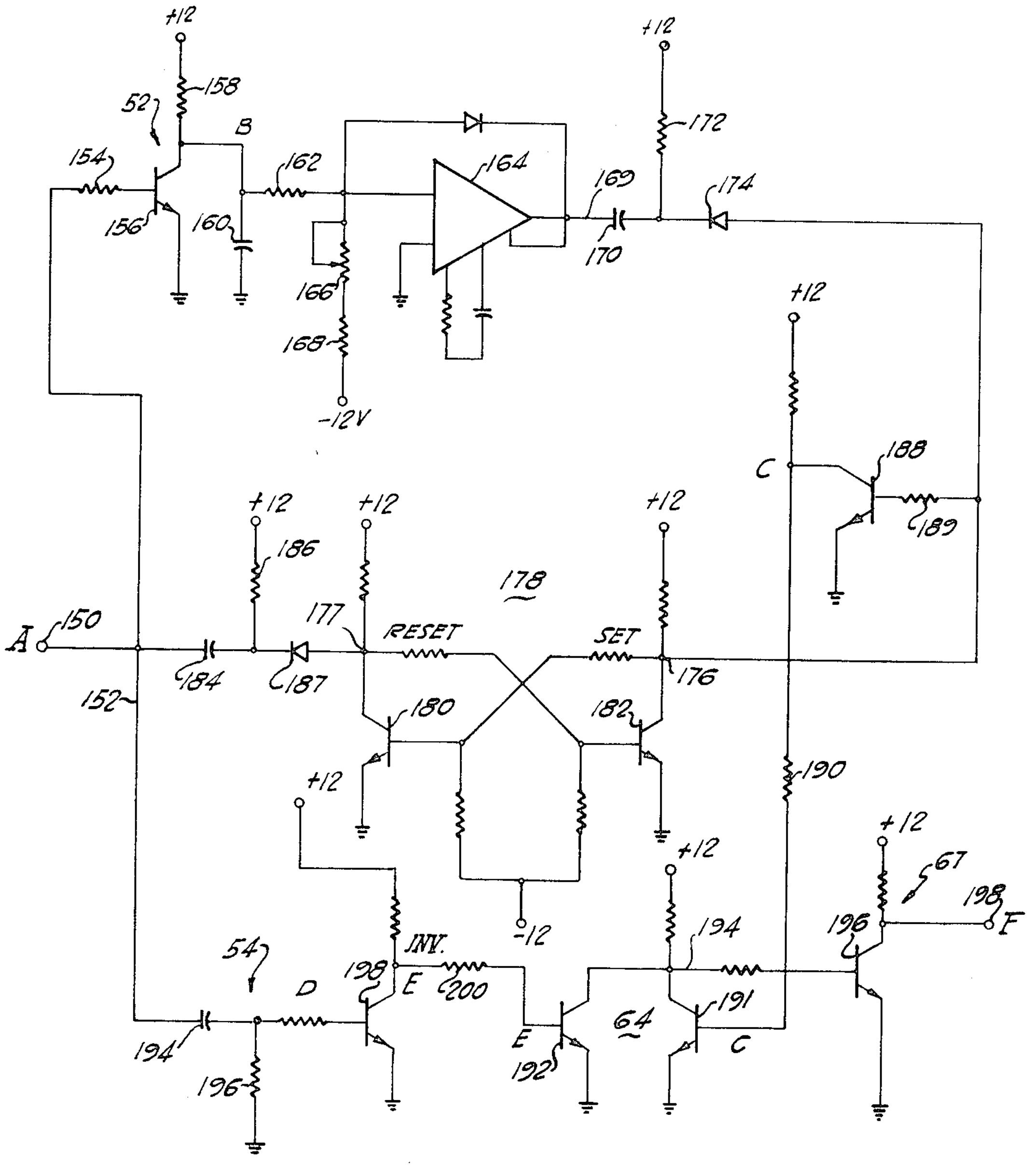
FIG. 6 is a schematic diagram of the high frequency detector circuit.

Reference is now made to FIG. 6 which shows in schematic diagram form the various circuits making up the high frequency detector 34. The A waveform from the automatic threshold circuit appearing at terminal 150 is applied through conductor 152 and resistor 154 to the timing circuit 52 comprising transistor 156, resistor 158 and capacitor 160. During the high or "1" portions of the A signal representing white, transistor 156 is in saturated conduction and capacitor 160 is depleted of its charge. During the low or "O" portions of the A signal representing black, the transistor 156 is cut off and the capacitor 160 charges towards a supply voltage through resistor 158. Thus, the ramp form signal shown as waveform B is generated across the capacitor 160. This ramp signal is applied through a resistor 162 to the input of an operational amplifier 164. The amplifier 164 is biased off by means of the potentiometer 166 and resistor 168 to the negative voltage supply, and it is this bias which establishes the hold level indicated in waveform B of FIG. 3. The amplifier 164 operates as a threshold detector in that it maintains at its output on conductor 169 a high voltage of perhaps 12 volts as long as its input signal is below the bias level and jumps to a low voltage of perhaps 0 volts as soon as the input crosses above the bias level. The amplifier 164, therefore, forms a part of the sample and hold circuit 58, the other part of which is formed by a flip-flop 178.

The output of operational amplifier 164 is differentiated by capacitor 170 and resistor 172 with the negative going peaks being passed through diode 174 to the set input 176 of a flip-flop circuit 178. The flip-flop 178 is in its set condition when transistor 180 is in its nonconducting condition and transistor 182 is in its conducting condition. The negative going peaks passing through diode 174 whenever the input to operational amplifier 164 goes above its threshold level switch the flip-flop 178 to its set condition. The flip-flop receives a reset pulse from the leading edge of each black pulse which is applied through a differentiator comprising capacitor 184, resistor 186 and the diode 187 to the reset terminal 177.

The set terminal of the flip-flop is also connected to the base of transistor 188, so that the signal appearing at its collector and through resistor 190 to the base of transistor 191 is the inverted status of the flip-flop set output which is the waveform C of FIG. 3.

The transistor 191 forms one input to the NOR-gate 64 of which transistor 192 forms the other input. This input, as previously indicated, is derived from the A waveform signal at terminal 150 through the differentiator 54 formed by capacitor 194 and resistor 196. The positive going peaks thereof which appear at the leading edge of the white portions of the signal are inverted by transistor 198 and applied through a resistor 200 to the NOR-gate 64. Thus, the signal appearing at the base of NOR-gate transistor 192 is the E waveform signal shown in FIG. 3. As may be seen the gate 64 operates such that if either the E input or the C input is high, then the signal on the output conductor 194 is low. If, however, both the E and C inputs are low, then the signal on conductor 194 is high. The transistor 196 operates as the inverter 67, so that the signal appearing at terminal 198 connected to the collector of transistor 196 is the F waveform shown in FIG. 3. To summarize the operation of the high frequency detector, the differentiated pulse peaks representing the leading edges of the white signal portions of the data signal will be passed through the gate 64 whenever the flip-flop 178 is in its reset condition. Flip-flop 178 will not be switched from its reset to its set condition if the duration of the black level portion of the signal is too short for the ramp signal to turn to the threshold detector amplifier circuit 164. Whenever the black level pulse is long enough to trigger on the amplifier 164, the flip-flip 178 is set and the gate 64 is closed to inhibit the white level pulse leading edge peaks.

Figure 7:
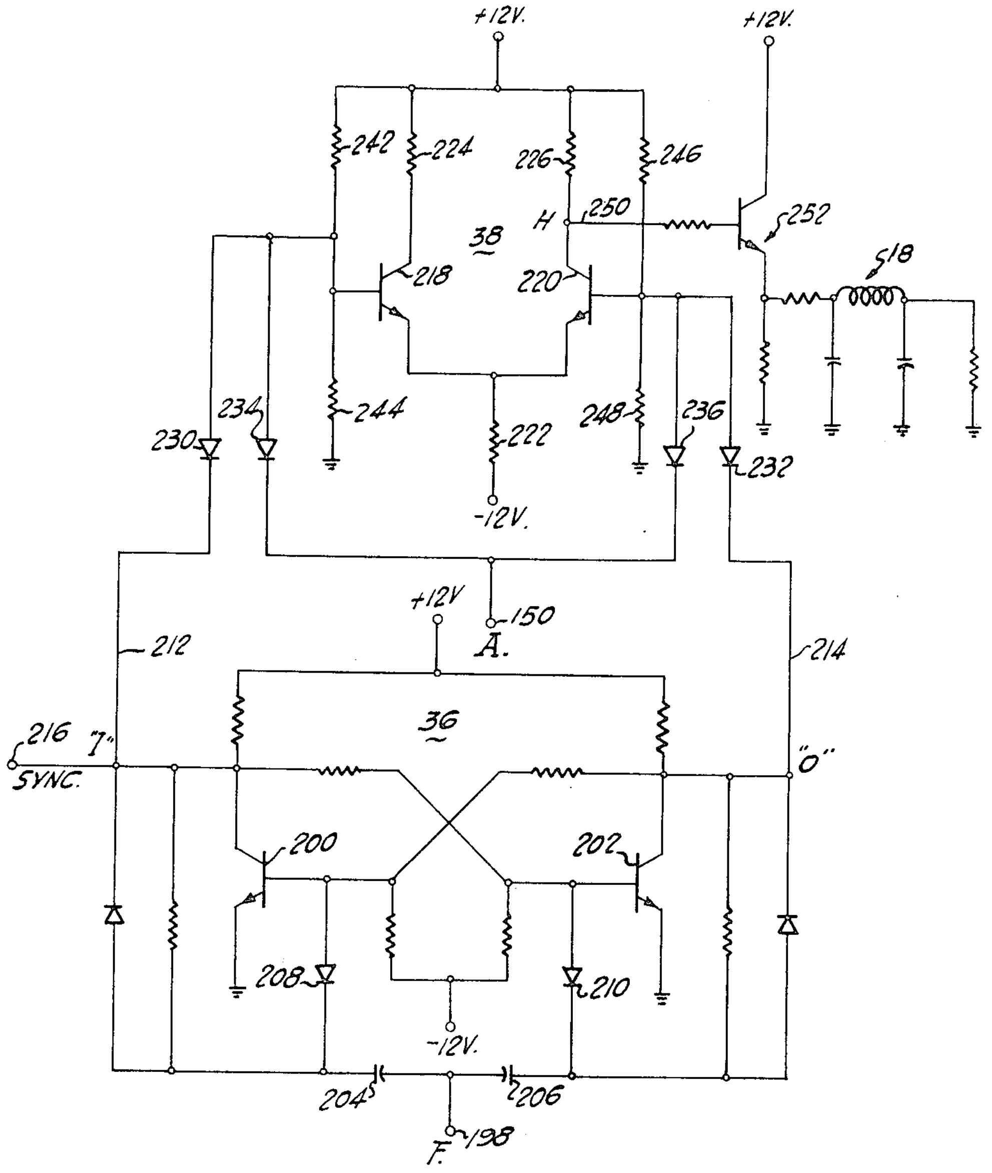
FIG. 7 is a schematic diagram of the two level to three level converter and the flip-flop utilized in the transmitter encoder shown in FIG. 1.

The flip-flip 36 and the two level to three level converter 38 are shown in schematic detail in FIG. 7. The flip-flip 36 is an ordinary bistable flip-flop circuit comprising transistors 200, 202 to which the trigger pulses from the output of the high frequency detector appearing at terminal 198 are applied. This is the waveform F and it is transmitted to the respective transistor bases through capacitors 204, 206 and diodes 208, 210. Thus, each negative going pulse appearing at terminal 198 switches the state of the flip-flop indicated by the conduction or cutoff of transistors 200, 202. The G waveform of FIG. 3 signifying the output status of flip-flop 36 is derived on conductor 212 connected to the "1" output of flip-flop 36 and the inverse of the G waveform appears on conductor 214 connected to the "O" output thereof. The previously mentioned sync signal is applied to terminal 216 which serves to restore the flip-flop 36 to its "O" state at the beginning of each scanned line.

The two level to three level converter 38 is a simple form of differential amplifier comprising two transistors 218, 220 which have their emitters connected through a common resistor 222 to −12 volt source and their collectors through equal valued resistors 224, 226 to a positive 12 volt source. The bases of the transistors 218, 220 are connected through respective diodes 230, 232 to the "1" and "O" outputs of the flip-flop 36. They are also connected through respective diodes 234, 236 to terminal 150 at which appears the output signal from the automatic threshold circuit or the A waveform of FIG. 3. Suitable biasing circuits including resistors 240, 242, 244, 246 and 248 are provided at the inputs to the transistors 218, 220 such that in a quiescent state with equal voltages at the base of transistors, the collectors of each transistor will set at some intermediate level such as approximately 6 volts.

The purpose of the diodes 230, 232, 234 and 236 is to shunt base current away from its respective transistor whenever its cathode goes to zero. If at least one of the diodes connected to each transistor base goes to zero, it may be seen that the transistors will conduct at an intermediate value to provided the intermediate or 6 volt level on output conductor 250. Thus, since the output of the automatic threshold circuit is applied to the bases of both transistors 218, 220, the output of the differential amplifier at conductor 250 will go to the intermediate level whenever the A signal goes low representing black. If, however, the A signal is high representing a white level portion and the flip-flop 36 is in its "O" state with a high on conductor 214 to diode 232, then transistor 220 conducts heavily and the signal on conductor 250 falls to a low value of perhaps 0 volts. On the other hand, if the signal at terminal 150 is high and the flip-flop 36 is in its "1" state such that both diodes 230 and 234 are back biased, transistor 218 conducts heavily causing transistor 220 to cut off and the signal at conductor 250 to rise to a high level of perhaps 12 volts. Thus, the circuit 38 corresponds to the input/output logic table previously described with respect to the block diagram of FIG. 1.

The signal on conductor 250 is the biternary waveform H as shown in FIG. 3, and this signal is applied through an impedance matching emitter follower transistor circuit 252 to the low pass filter 18. The low pass filter removes the higher harmonics from the signal, so as to limit the extend of the sidebands produced by the modulator The acceptable baseband bandwith for an FM system, such as in out application, over dial telephone network is approximately 1,200 Hz. In the preferred embodiment of this invention, the constants of the circuit are set such that the output signal will switch from operation between the intermediate level and the opposite outer level whenever the frequency of the incoming signal exceeds approximately one-half of the allowed bandwidth. In other words, the biased level control 166 of the threshold detector 164 in the sample and hold circuit of FIG. 6 is set so that black pulses less than 0.87 milliseconds (representing a frequency slightly in excess of 600 Hertz) will cause a trigger pulse to be applied to the flip-flop 36 to cause a shift in the output operating levels of the two level to three level converter 38. By placing this level at approximately the half bandwidth level, a substantial degree of the second harmonic component is eliminated from the signal which causes the greatest distortions when passed through the subsequent low pass band circuits.

Figure 8:
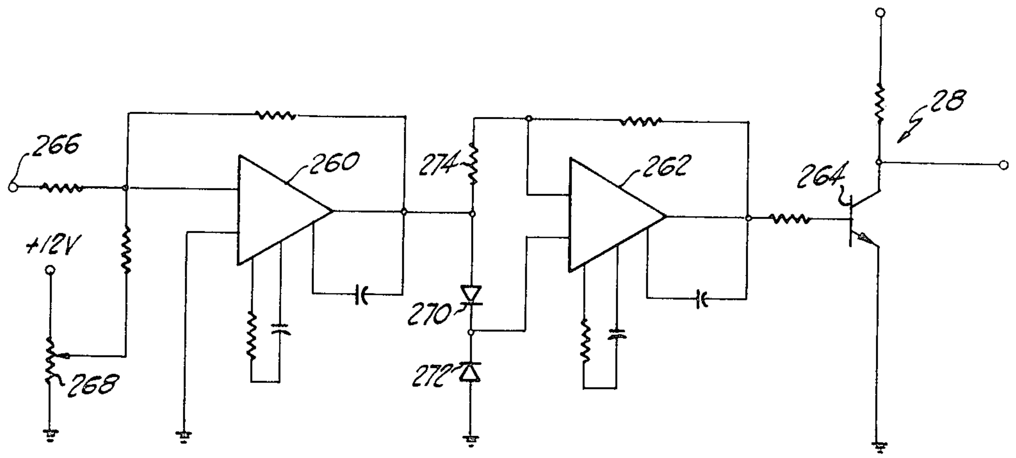
FIG. 8 is a schematic diagram of the decoding circuits in the facsimile receiver.

The receiver decoder 26 is shown in schematic detail in FIG. 8. It includes a first operation amplifier 260 which is connected as a simple signal level shifter and a second operational amplifier 262 which is connected as a simple full wave rectifier. The demodulated receiver signal appearing at terminal 266 is a biternary signal similar appearing at terminal 266 is a biternary signal similar to waveform H of FIG. 3 with an intermediate operating level of 3½ volts and outer levels of 0 volts and 7 volts respectively. The output therefrom is inverted biternary signal which fluctuates between −3½ volts and positive 3½ volts with 0 volts representing the intermediate value. The operational amplifier 262 which operates as a full wave rectifier by means of its input connections including diodes 270, 272 and resistor 174 reconverts the signal to a two level digital signal corresponding very much in form to the data waveform signal A of FIG. 3. The signal is then inverted by the circuit 28 including transistor 264 so as to be applicable to an ordinary type of facsimile recorder such as the well-known electrolytic type.

While there has been described herein a preferred embodiment of the present invention as it relates to facsimile systems, it is recognized that many modifications or additions may be made thereto without materially deviating from the teachings of the invention. For example, in some facsimile applications of this band compression system, it might be desirable to base the signal level conversions on the time duration of the white level portions of the signal rather than on the black level portions as shown herein. Furthermore, there may be other data handling systems to which these teachings may be applied whenever it is desired to transmit biternary signals without reliance on a synchronize clock timing system.

What is claimed is:

1. A facsimile system comprising means for scanning a copy document and providing a digital signal having a first level representing a first condition of copy density and a second level representing a second condition of copy density; means for producing an output signal having an intermediate level always representative of said first copy density condition and two outer levels on either side of said intermediate level either of which is representative of said second copy density condition; means for timing the duration of each first level portion of said digital source signal; means responsive to said timing means for switching said output signal producing means to operate between said intermediate level and one of said outer levels as long as the time duration of each first level portion is longer than a predetermined time and to switch to operation between said intermediate level and the opposite outer level whenever the time duration of one of said first level portions is shorter than said predetermined time, means for transmitting said output signal; means at a remote location for receiving the transmitted signal; means for converting the received signal into a two level digital signal; means for marking a recording medium in accordance with said converted two level digital signal to reproduce the copy document; and wherein said timing means comprises means for providing a sustained signal whenever said first level portion of said source signal is longer than said predetermined time, means for providing a signal indicating the occurrence of the lagging edge of each first level portion of said source to signal, gate means responsive to the occurrence of said lagging edge signal and the absence of said sustained signal for providing a switching signal to said switching means and responsive to the presence of said sustained signal for preventing a switching signal to said switching means, and means for resetting said sustained signal providing means responsive to the lagging edge of each second level portion of said source signal.

2. In the system of claim 1 wherein said sustained signal providing means comprises means for charging a capacitor at a substantially linear rate during each first level portion of said source signal, a threshold detector for determining when the charge level of said capacitor reaches a level corresponding to said predetermined time and a flip-flop circuit operable responsive to said threshold detector to change to its set state for providing said sustained signal and operable responsive to said resetting means to change to its reset state; wherein said lagging edge indicating means comprises a signal differentiator; wherein said gate means comprises a Nor gate; and wherein said resetting means comprises a signal differentiator.

* * * * *